US012712098B2

(12) United States Patent
Lee et al.

(10) Patent No.: US 12,712,098 B2
(45) Date of Patent: Aug. 18, 2026

(54) SUBMARINE CABLE

(71) Applicant: LS CABLE & SYSTEM LTD., Anyang-si (KR)

(72) Inventors: Jae Bok Lee, Gwanak-gu (KR); Chul Min Kim, Suwon-si (KR)

(73) Assignee: LS CABLE & SYSTEM LTD., Anyang-si (KR)

(*) Notice: Subject to any disclaimer, the term of this patent is extended or adjusted under 35 U.S.C. 154(b) by 182 days.

(21) Appl. No.: 18/678,434

(22) Filed: May 30, 2024

(65) Prior Publication Data

US 2025/0336567 A1 Oct. 30, 2025

(30) Foreign Application Priority Data

Apr. 29, 2024 (KR) ........................ 10-2024-0056855

(51) Int. Cl.

| | |
|---|---|
| ***H01B 9/00*** | (2006.01) |
| ***H01B 7/14*** | (2006.01) |
| ***H01B 9/02*** | (2006.01) |
| ***H01B 9/04*** | (2006.01) |

(52) U.S. Cl.

CPC ............... *H01B 9/025* (2013.01); *H01B 7/14* (2013.01); *H01B 9/005* (2013.01); *H01B 9/027* (2013.01); *H01B 9/04* (2013.01)

(58) Field of Classification Search

CPC ........ H01B 9/025; H01B 9/005; H01B 9/027; H01B 9/04

See application file for complete search history.

(56) References Cited

U.S. PATENT DOCUMENTS

2019/0013112 A1* 1/2019 Jung ...................... H01B 9/027

FOREIGN PATENT DOCUMENTS

| | | | | | |
|---|---|---|---|---|---|
| JP | 2012221597 A | | 11/2012 | | |
| JP | 2015138579 A | | 7/2015 | | |
| JP | 2019109970 A | | 7/2019 | | |
| JP | 2021034263 A | * | 3/2021 | ............... | H01B 7/04 |
| KR | 20220093550 A | * | 7/2022 | ............... | H01B 7/14 |
| KR | 20230081954 A | | 6/2023 | | |

OTHER PUBLICATIONS

Office Action for related Korean Application No. 10-2024-0056855; action dated Dec. 11, 2025; (6 pages).

* cited by examiner

*Primary Examiner* — Pete T Lee
(74) *Attorney, Agent, or Firm* — K&L Gates LLP

(57) ABSTRACT

The present disclosure relates to a submarine cable in which cross-wound directions and cross-wound pitches of a metal wire and a shielding member surrounding an outer side of the metal wire that constitute a metal shielding layer of the submarine cable are optimized to minimize damage to the metal shielding layer, to enable rapid energization in the event of an accidental current, and further to enhance flexibility by varying the cross-wound pitch of at least one of the metal wire and the shielding member that constitute the metal shielding layer according to an environment in which the submarine cable is laid.

10 Claims, 4 Drawing Sheets

SUBMARINE CABLE

CROSS REFERENCE TO RELATED APPLICATIONS

The present application claims priority to Korean Patent Application No. 10-2024-0056855, filed on Apr. 29, 2024, the entire contents of which is incorporated herein for all purposes by this reference.

FIELD

The present disclosure relates to a submarine cable. More specifically, the present disclosure relates to a submarine cable capable of optimizing cross-wound directions and cross-wound pitches of a metal wire and a shielding member surrounding an outer side of the metal wire that constitute a metal shielding layer of the submarine cable, and further capable of minimizing damage to the metal shielding layer by varying the cross-wound pitches of the metal wire and the shielding member that constitute the metal shielding layer depending on an environment in which the submarine cable is laid.

BACKGROUND

Recently, a renewable energy system that is connected to onshore power facilities with power cables and supplies electric power generated by wind power generators and the like installed in remote offshore areas with sufficient wind volume at a predetermined distance from land has been attracting attention.

When the ocean depths where the offshore wind power generator and the like are installed are shallow, it is possible to install the wind power generator by installing a structure on the seabed and then installing the wind power generator on top of the structure, but when the ocean depths are deep, the wind power generator may be installed by a floating method.

Further, the wind power generators installed offshore or substations connecting the wind power generators and the onshore power facilities may be connected by submarine cables laid underwater.

Here, a section from the onshore power facilities to the seabed near the offshore wind power generator is a section where the submarine cable is laid on the seabed, and since no movement of the cable occurs while transmitting power after the cable is laid, this section is referred to as a static section, and the submarine cable laid in this section is generally referred to as a static submarine cable. In contrast, a section from the seabed near the wind power generator to the wind power generator or substation of the floating method is referred to as a dynamic section because many behaviors such as bending, tension, or twisting occur in the cable due to currents, waves, and the like, and the submarine cable laid in this section is referred to as a dynamic submarine cable.

The dynamic submarine cable installed in the dynamic section is subjected to long-term repetitive bending loads due to movements or bending caused by currents or waves, and it is difficult to apply a lead-covered shielding layer that is difficult to withstand such an environment to the dynamic submarine cable as a metal shielding layer.

Therefore, in the dynamic submarine cable, instead of the lead-covered shielding layer, a plurality of metal wires are spirally cross-wound in a state of being plurally spaced apart on top of the outside semi-conducting layer to form a metal wire layer, and a shielding member in the form of a metal tape is cross-wound on an outer side of the metal wire layer to ensure overall electrical conductivity throughout the metal wire layer, thereby constituting the metal shielding layer.

The metal shielding layer of such a structure may cause the metal wire and the shielding member to be strongly constrained to each other under repeated bending or tensile action of the submarine cable, which may lead to a problem of breaking or twisting of the metal wire or breaking of the shielding member, thereby resulting in a fault current passage and deterioration of a shielding function of the metal shielding layer.

Further, the metal wire and the shielding member are installed in the form of being spirally cross-wound, but there is a great difference in the durability and the like of the metal shielding layer according to cross-wound directions and cross-wound pitches of the metal wire and the shielding member.

In addition, in the case of the dynamic submarine cable, a stiffener may be installed in a portion connected to an underwater facility to prevent the submarine cable from being bent, and a floating module may be mounted to prevent the submarine cable from being swept on the seabed in an underwater environment. As such, an area where the stiffener, the floating module, or the like is installed may be subjected to greater bending, flexing, or twisting than an area that is floating underwater.

Therefore, it is necessary to optimize a cross-wound direction, a cross-wound pitch, and the like of each of the metal wire and the shielding member constituting the metal shielding layer, in order to reliably provide an fault current passage and a shielding function while providing excellent durability even in an environment where continuous bending or flexing occurs without being fixed underwater and in an area where a stiffener or a floating module is installed.

SUMMARY

The present disclosure is directed to providing a submarine cable in which cross-wound directions and cross-wound pitches of a metal wire and a shielding member surrounding an outer side of the metal wire that constitute a metal shielding layer of the submarine cable are optimized to minimize damage to the metal shielding layer, to enable rapid energization in the event of an accidental current, and further to enhance flexibility by varying the cross-wound pitch of at least one of the metal wire and the shielding member that constitute the metal shielding layer according to an environment in which the submarine cable is laid.

There is provided a submarine cable including one or more power units, in which the power unit may include: a conductor; an internal semi-conductive layer surrounding the conductor; an insulating layer surrounding the internal semi-conductive layer; an outer semi-conductive layer surrounding an outer side of the insulating layer; and a metal shielding layer provided on an outer side of the outer semi-conductive layer, in which the metal shielding layer may include a plurality of metal wires spaced apart from and spirally cross-wound on the outer side of the outer semi-conductive layer, and a shielding member cross-wound on an outer side of the plurality of metal wires, and in which the metal wire and the shielding member may be cross-wound in the same spiral direction, and a cross-wound pitch of the shielding member may be smaller than a cross-wound pitch of the metal wire and greater than a cross-wound width of the shielding member.

In addition, the cross-wound pitch of the shielding member may be provided to be 0.8 times or less than the cross-wound pitch of the metal wire and three times or more than the cross-wound width of the shielding member.

Further, in one power unit, at least one of the metal wire and the shielding member may be provided with at least one bending reinforcement section cross-wound with a reinforcement cross-wound pitch reduced from a reference cross-wound pitch that is preset for each of the metal wire and the shielding member.

Here, the bending reinforcement section may be a section in which a floating module is installed among sections in which the submarine cable is disposed underwater.

In this case, the bending reinforcement section may be a section at a point where the submarine cable is in contact with the seabed.

Further, the bending reinforcement section may be a section in which a stiffener is installed at a site where the submarine cable and an offshore facility are connected.

In addition, the bending reinforcement section may be a section at a point where the submarine cable is connected at an intermediate point underwater.

Further, the shielding member may be provided as a tape of a metal material.

Here, the shielding member may be a braided strap in which a plurality of metal wire rods are braided such that a cross sectional width is greater than a cross sectional thickness.

In this case, the submarine cable may further include: a plurality of the power units; a plurality of shaped fillers disposed between the power units to receive the power units in a state in which the power units are spaced apart from each other, and constituting a cross-sectional shape of the submarine cable as a circular shape; at least one optical unit received in at least one of the plurality of shaped fillers, and provided with an optical fiber; a bedding layer provided on an outer side of the plurality of power units and the plurality of shaped fillers; at least one armor layer provided with a plurality of armor wires disposed on an outer side of the bedding layer being cross-wound; and an outermost layer provided on an outer side of the armor layer.

According to the submarine cable according to the present disclosure, the shielding member and the metal wires constituting the metal shielding layer of the power unit are cross-wound in the same spiral direction, and the cross-wound pitch of the shielding member is provided to be smaller than the cross-wound pitch of the metal wire and greater than the cross-wound width of the shielding member, thereby minimizing damage to the metal wire by the shielding member and enabling rapid energization when an accident current occurs.

In addition, according to the submarine cable according to the present disclosure, the flexibility of the submarine cable can be enhanced by varying the cross-wound pitch in at least one of the metal wire and the shielding member of the metal shielding layer constituting the submarine cable for each section.

DETAILED DESCRIPTION

Figure 1:
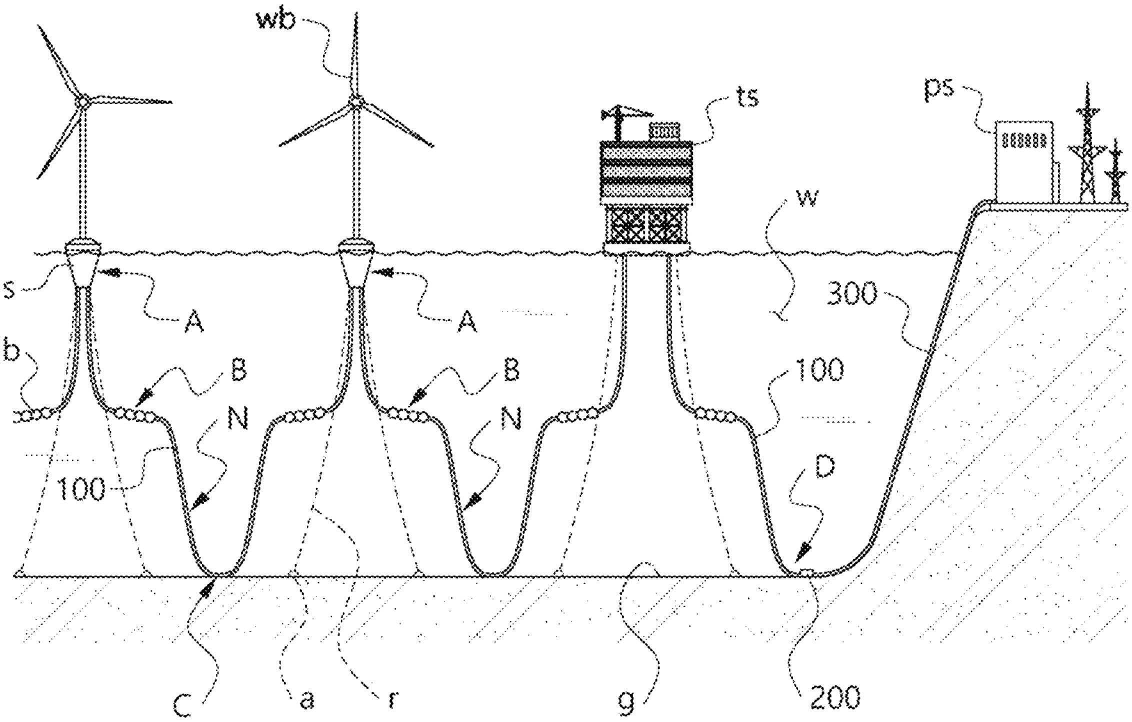
FIG. 1 illustrates an example of a configuration of an offshore wind power generating system connected by a submarine cable.

Hereinafter, exemplary embodiments of the present disclosure will be described in detail with reference to the accompanying drawings. However, the present disclosure is not limited to the exemplary embodiments to be described below and may be specified as other aspects. On the contrary, the embodiments introduced herein are provided to make the disclosed content thorough and complete, and sufficiently transfer the spirit of the present disclosure to those skilled in the art. Like reference numerals indicate like constituent elements throughout the specification.

FIG. 1 illustrates an example of a configuration of an offshore wind power generating system connected by a submarine cable.

When the ocean depths where an offshore wind power generator wb and the like are installed are shallow, it is possible to install the wind power generator by installing a structure on the seabed and then installing the wind power generator on top of the structure, but when the ocean depths are deep, the wind power generator wb may be installed by a floating method.

The wind power generator, a substation facility ts, and the like of the floating method may be supported by a floating object for floating and floated above the sea level, and may be connected to an anchor a installed on the seabed by a support line r to be restricted in movement.

Further, the wind power generators installed offshore or the substation ts connecting the wind power generators and an onshore power facility ps may be connected by a submarine cable that is laid underwater.

Here, a section from the onshore power facility ps to the seabed is a section where the submarine cable is laid on the seabed, and since no movement of the cable occurs while transmitting power after the cable is laid, this section is referred to as a static section, and the submarine cable laid in this section is generally referred to as a static submarine cable 300. In contrast, in a section between the wind power generators wb of the floating method, from the wind power generators wb to the substation ts, or from the substation ts to an intermediate junction box 200 on the seabed, since many behaviors such as bending, tensioning, or twisting occur in the cable due to currents, waves, and the like, this section is referred to as a dynamic section, and a submarine cable laid in this section is referred to as a dynamic submarine cable 100.

The dynamic submarine cable 100 is laid underwater, and may be provided with a floating module b in a predetermined section when the ocean depth is deep. The submarine cable may be kept in a floating state in the sea by the floating module b, which prevents the submarine cable 100 from colliding with sharp rocks or obstacles in the sea, the floating module b may allow the submarine cable to be easily manipulated and moved in the sea to facilitate maintenance, and the floating module b may also provide an identification function in offshore operations by visually indicating a position of the submarine cable.

In addition, a stiffener s may be mounted when the submarine cable is connected to a facility floating on the sea, or at a portion where the dynamic submarine cable and the static submarine cable are connected. The stiffener s may perform a function of distributing a bending moment when bending and the like occurs at a connection portion of the submarine cable to prevent the submarine cable 100 from being damaged.

Such a dynamic submarine cable 100 is subjected to long-term repetitive bending loads due to movements or bending caused by currents or waves, and it is difficult to apply a lead-covered shielding layer that is difficult to withstand such an environment to the dynamic submarine cable as a metal shielding layer. Therefore, instead of the lead-covered shielding layer, a plurality of metal wires are spirally cross-wound in a state of being plurally spaced apart on top of a bedding layer to form a metal wire layer, and a shielding member is cross-wound on an outer side of the metal wire layer to ensure overall electrical conductivity throughout the metal wires, thereby constituting the metal shielding layer.

However, the shielding member which is cross-wound on an outer side of the metal wire constituting the metal shielding layer may be configured, for example, with copper tape and the like. The metal shielding layer of such a structure may be strongly compressed by a cable protection layer provided with an armor wire and the like during repeated bending or flexing of the submarine cable, thereby leading to a problem of breaking or twisting of the metal wire constituting the metal shielding layer or breaking of the shielding member, and the transmission of fault current to adjacent metal wires through the shielding member may be delayed, which may cause a problem of heat generation, thereby reducing the durability of the submarine cable.

Therefore, the present disclosure matches cross-wound directions of the metal wire and the shielding member constituting the metal shielding layer, and optimizes cross-wound pitches thereof to prevent the submarine cable from being degraded in durability.

Figure 2:
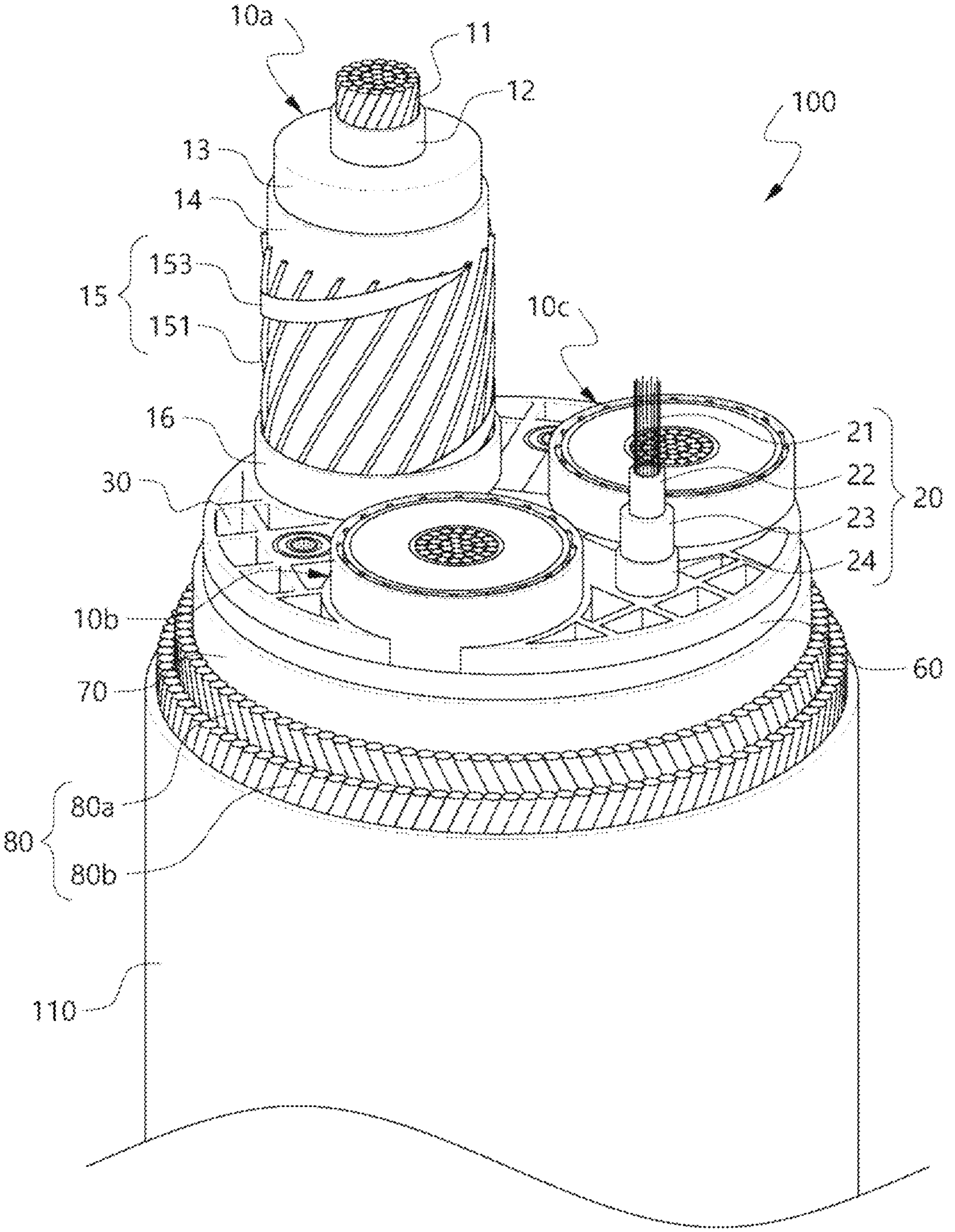
FIG. 2 illustrates a multi-stage stripped perspective view of a dynamic submarine cable for underwater laying according to the present disclosure.

FIG. 2 illustrates a multi-stage stripped perspective view of a dynamic submarine cable for underwater laying according to the present disclosure.

The submarine cable 100 according to the present embodiment of the disclosure may include a cable core portion including one or more power units 10 to transmit power, and a cable protection layer surrounding an outer side of the cable core portion. The cable core portion may include three power units 10, an optical unit 20, and a shaped filler 30, and the cable protection layer may include a bedding layer 70, an armor layer 80, and an outermost layer 110. A detailed description of each configuration will be described below.

In the embodiment of the present disclosure, a three-phase cable provided with three power units 10 is illustrated as an example, but the present disclosure is not limited thereto and may be applied to cases in which only one power unit 10 is provided, or a different number of power units 10 is provided.

Each of the power units 10 may be configured to include a conductor 11, an inner semi-conductive layer 12, an insulating layer 13, an outer semi-conductive layer 14, a metal shielding layer 15, and a polymer sheath 16.

The conductor 11 serves as a passage through which current flows to transmit power, and may be made of a material, such as copper or aluminum, which has a good conductivity so as to minimize power losses, and a strength and flexibility suitable for cable manufacturing and use.

As illustrated in FIG. 2, the conductor 11 may be a collective conductor for which a plurality of circular elemental wires are stranded and collected in a circular shape, and specifically may be a collective conductor for which the wires are united in an S-direction or a Z-direction.

However, the conductor 11 may have an uneven electric field due to a non-smooth surface thereof, and is partially vulnerable to corona discharge. In addition, the insulation performance of the conductor 11 may be degraded when voids are formed between the surface of the conductor 11 and the insulation layer 13 described below.

To solve the aforementioned problems, an internal semi-conductive layer 12 may be provided outside the conductor 11. The internal semi-conductive layer 12 may have semi-conductivity due to the addition of conductive particles such as carbon black, carbon nanotubes, carbon nanoplates, graphite, and the like to an insulating material.

The internal semi-conductive layer 12 performs a function of stabilizing the insulating performance by preventing a sudden electric field change from occurring between the conductor 11 and the insulation layer 13 described below. In addition, the electric field may be uniformed by suppressing uneven charge distribution on the surface of the conductor, and the formation of voids between the conductor 11 and the insulation layer 13 may be prevented to suppress corona discharge, insulation breakdown, and the like.

The insulation layer 13 is provided outside the internal semi-conductive layer 12 to electrically insulate the conductor 11 from the outside so that the current flowing along the conductor 11 does not leak to the outside. Generally, the insulation layer 13 may have a high breakdown voltage, and the insulating performance thereof may be maintained stably for a long period of time. Further, the insulation layer 13 needs to have low dielectric loss and resistance to heat, such as heat resistance. Therefore, as the insulating layer 13, a polyolefin resin such as polyethylene and polypropylene may be used, and the polyethylene resin may be made of cross-linked resin.

An outer semi-conductive layer 14 may be provided outside the insulation layer 13. The outer semi-conductive layer 14 is formed of a material having semi-conductivity by adding conductive particles, for example, carbon black, carbon nanotubes, carbon nanoplates, graphite, and the like, to the insulating material like the inner semi-conductive layer 12, to suppress the uneven charge distribution between the insulating layer 13 and the metal shielding layer 15 described below, thereby stabilizing the insulating performance. In addition, in the cable, the outer semi-conductive layer 14 may also perform the functions of smoothing the surface of the insulation layer 13 to alleviate electric field concentration to prevent corona discharge, and physically protecting the insulation layer 13.

The metal shielding layer 15 and the polymer sheath 16 may be provided outside the outer semi-conductive layer 14. The metal shielding layer 15 and the polymer sheath 16 may protect the power unit 10 from various environmental factors such as moisture ingress, mechanical trauma, corrosion that may affect the power transmission performance of the cable.

The metal shielding layer 15 may not only protect the power unit 10 from an impact from the outside, but may also be grounded at the end of the power unit 10 to serve as a passage through which an accident current flows in the event of an accident such as a ground fault or a short circuit, thereby shielding the electric field from discharging to the outside of the power unit 10.

Generally, a lead sheath may be used as the metal shielding layer 15, or a metal wire and a shielding member may be used. As described above, in the case of the dynamic submarine cable 100, since there is a concern that the lead sheath may experience fatigue failure due to the cable behavior, a shielding member 153 which is cross-wound on a plurality of metal wires provided with a material such as copper and the like, and which is cross-wound across a metal wire 151 may be applied as the metal shielding layer 15.

A polymer sheath 16 composed of a resin, such as polyvinyl chloride (PVC), polyethylene, and the like, and formed by extrusion may be provided outside the metal shielding layer 15, which may perform the function of improving the corrosion resistance, water resistance, and the like of the submarine cable, and protecting the cable from mechanical trauma and other external environmental factors such as heat, ultraviolet light, and the like. In particular, in the case of the submarine cable, it is preferable to use a polyethylene resin having good water resistance.

In addition, the power unit 10 may be further provided with a copper wire direct-in tape (not illustrated) or a moisture absorbing layer (not illustrated) between the metal shielding layer 15 and the outer semi-conductive layer 14. In addition, a moisture absorbing layer (not illustrated) may be further provided between the metal shielding layer 15 and the polymer sheath 16.

The copper wire direct-in tape may be configured with a copper wire, a non-woven tape, and the like, and may serve to facilitate electrical contact between the outer semi-conductive layer and the metal shielding layer 15.

The moisture absorbing layer (not illustrated) may be made in the form of a powder, tape, a coating layer, a film, or the like, which includes a super absorbent polymer (SAP) that has a high rate of absorbing moisture that has penetrated into the cable and has an excellent capability of maintaining an absorbent swollen state. Accordingly, the moisture absorbing layer may prevent moisture from penetrating in a lengthwise direction of the cable. In addition, the moisture absorbing layer may be configured to include copper wires in the moisture absorbing layer to prevent sudden changes in the electric field in the moisture absorbing layer.

In particular, when the metal wire 151 and the shielding member 153 are applied as the metal shielding layer 15, which is laid in a dynamic section of the seabed, the water resistance performance is inferior compared to the lead sheath, and thus it is desirable that a moisture absorbing layer (not illustrated) is further provided to improve the water resistance performance.

Meanwhile, the submarine cable 100 may be further provided with the optical unit 20.

Here, the optical unit 20 may be provided with at least one optical fiber 21 and a tube 22 receiving the optical fiber 21.

The optical unit 20 is provided with a predetermined number of optical fibers 21 mounted with fillers (not illustrated) and the like in the tube 22, and the tube 22 may be made of a material having rigidity, such as stainless steel and the like. Further, the optical unit 20 may be further provided with a metal sheath 23 and a polymer sheath 24 surrounding the tube 22.

As illustrated in FIG. 2, the submarine cable 100 according to the present disclosure may include a plurality of shaped fillers 30 such that the plurality of power units 10 remain in a state of being spaced apart from each other and the submarine cable 100 is configured as a whole to be circular.

While the filling material is conventionally configured with yarns and the like of a polypropylene material, in the present disclosure, the filling material may be provided with the shaped filler 30, which is more advantageous for maintaining the circular shape of the submarine cable and protecting the internal configuration of the submarine cable. The shaped filler 30 is provided as a shape inclusion configured by being extruded from a material such as high density polyethylene (HDPE) or polyethylene (PE) having excellent chemical resistance, weather resistance (resistance to various climates), and hydrostatic resistance.

In addition, the shaped filler 30 may receive the optical unit 20 in an optical unit receiving portion 35 formed therein.

Further, a binding tape layer 60 may be further provided to surround the plurality of shaped fillers 30 to allow the cable core portion to remain circular, as illustrated in FIG. 2. The binding tape layer 60 may ensure that the plurality of shaped fillers 30 remain in a mutually supported state.

Meanwhile, the submarine cable 100 illustrated in FIG. 2 may be provided with a cable protection layer to protect internal constituent elements even in harsh environments such as sea water, salinity, and the like in the ocean.

As illustrated in FIG. 2, according to an embodiment of the present disclosure, the cable protection layer of the submarine cable may include a bedding layer 70 provided on an outer side of the shaped filler 30.

The bedding layer 70 may serve as a cushion to dispose an armor layer in which armor wires are disposed in at least one layer. The bedding layer 70 may be provided with two armor layers 80*a* and 80*b* on the outer side to enhance the mechanical strength of the submarine cable 100 in a harsh underwater environment, and an outermost layer 110 on the outer side of the armor layers 80*a* and 80*b*.

For example, the outermost layer 110 may be configured with a polymer resin, such as polyvinyl chloride (PVC), polyethylene, and the like, by extrusion method to protect the armor layers 80*a* and 80*b* while ensuring sufficient durability by minimizing damage to the submarine cable 100 by waves, currents, and the like in a harsh underwater environment.

The armor layers 80*a* and 80*b* may be configured with a plurality of armor wires spirally cross-wound on the outer side of the bedding layer 70, and perform the function of strengthening the mechanical properties and performance of the submarine cable 100, as well as further protecting the submarine cable 100 from external forces.

The armor wires constituting the armor layers 80*a* and 80*b* are preferably made of a metal material, but may also be made of a non-metallic material as long as the material has a high tensile force.

The armor wire made of a metallic material may be provided by cross-winding a wire made of steel, galvanized steel, copper, brass, bronze, and the like and having a cross-sectional shape of a circle, square, and the like, and the non-metallic armor wire may be provided in the form of a wire made of a material such as aramid fiber, which is a high tensile material, or ultra-high molecular weight polyethylene fiber.

Hereinafter, the embodiment of the present disclosure is described as using a metal armor layer formed of a metal armor wire, but the present disclosure is not limited thereto.

The armor wire constituting the metallic armor layer may be spirally cross-wound on the outer circumferential surface of the bedding layer 70 and the like, and may preferably be cross-wound in the Z direction or the S direction, which is opposite to the collective direction of the power unit 10.

Further, as illustrated in FIG. 2, in the submarine cable installed in a dynamic section, the cross-wound directions may be different when the armor layer 80 is provided in a plurality of layers for stiffness reinforcement.

In general, the submarine cable (300 in FIG. 1) laid in a static section may be provided with an armor layer in a single layer and a serving layer as an outermost layer on the outer side of the armor layer, but when the submarine cable 100 is laid in a dynamic section, a sheath layer of a polymer resin material performing a role of a cable jacket as the outermost layer 110 may be provided on the outer side of the armor layer.

Figure 3:
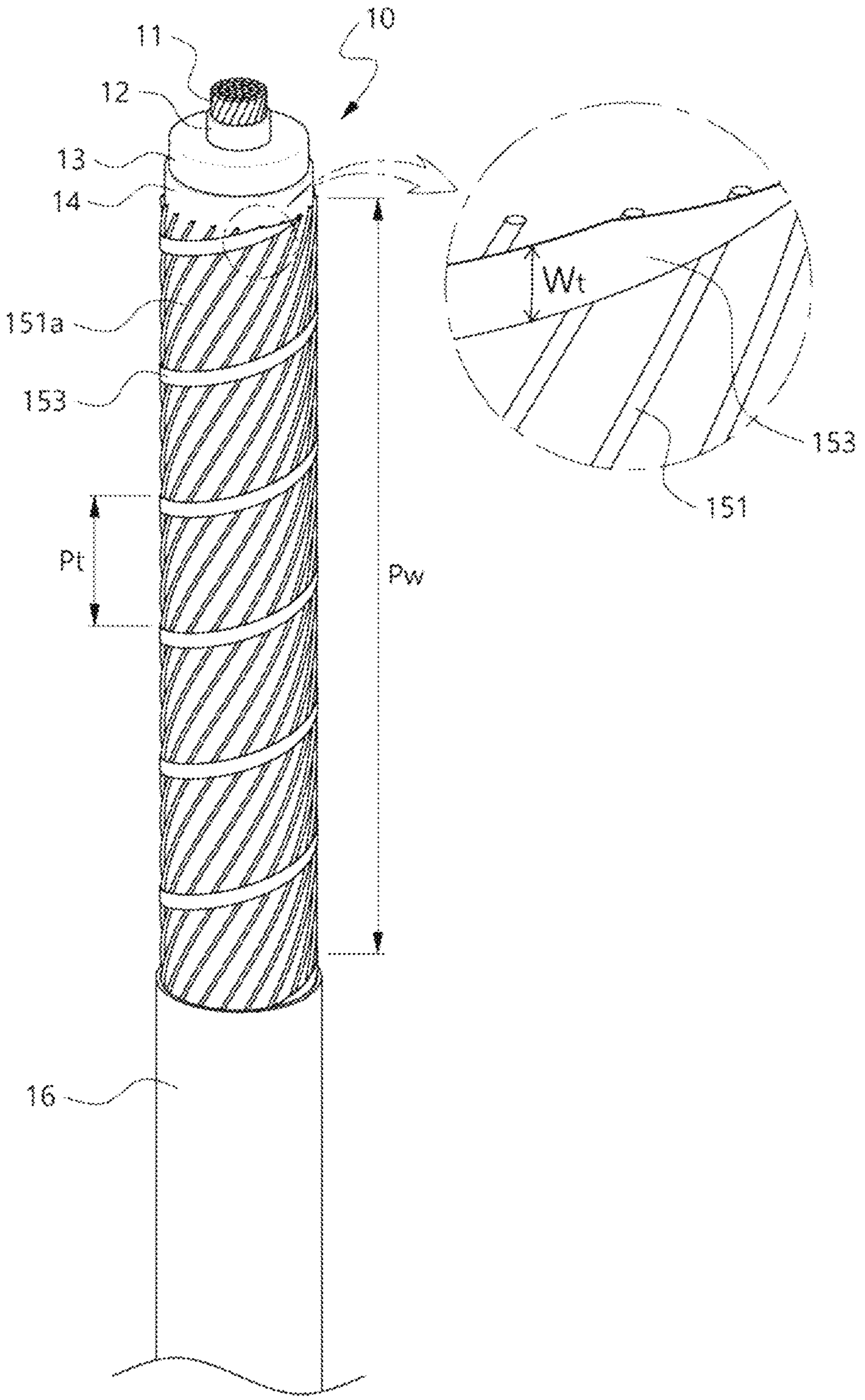
FIG. 3 illustrates a perspective view and partially enlarged view of one embodiment of a power unit according to the present disclosure.

FIG. 3 illustrates a perspective view and partially enlarged view of one embodiment of the power unit according to the present disclosure.

The power unit 10 according to the present disclosure may be configured, as described above, to include the conductor 11, the internal semi-conductive layer 12 surrounding the conductor, the insulation layer 13 surrounding the internal semi-conductive layer 12, the outer semi-conductive layer 14 surrounding the outer side of the insulation layer 13, and the metal shielding layer 15 provided on the outer side of the outer semi-conductive layer 14.

In addition, the power unit 10 according to the present disclosure may be provided without applying the metal shielding layer 15 in the form of a lead sheath, in consideration of the particularity of the underwater laying environment, and the metal shielding layer 15 may be provided including the plurality of metal wires 151 spirally spaced apart and cross-wound on the outer side of the outer semi-conductive layer 14, and the shielding member 153 cross-wound on the outer side of the plurality of metal wires 151.

In addition, the shielding member 153, which constitutes the metal shielding layer 15 of the power unit 10 according to the present disclosure illustrated in FIG. 3, may be provided as a tape made of a metal material. However, the shielding member 153 is not limited thereto, and the shielding member 153 constituting the metal shielding layer 15 of the power unit 10 may be a braided strap in which a plurality of metal wire rods are braided such that a cross sectional width is greater than a cross sectional thickness. The metal constituting the shielding member 153 may be copper, a copper alloy, or the like, and the metal wire rod being braided may mean a fine wire, an elemental wire, and the like.

The metal wire 151 may also be provided with a material such as copper or a copper alloy and the like, as is the shielding member 153.

The shielding member 153 constituting the metal shielding layer 15 of the power unit 10 of the present disclosure may be cross-wound in the same spiral direction (S-S direction or Z-Z direction) as the metal wire 151, but may be configured such that a cross-wound pitch Pt of the shielding member 153 is smaller than a cross-wound pitch Pw of the metal wire 151 and greater than a cross-wound width Wt of the shielding member 153.

The cross-wound pitch Pw of the metal wire 151 is a length at which the metal wire 151 has been completed one turn on the outer side of the outer semi-conductive layer 14, the cross-wound pitch Pt of the shielding member 153 is a length at which the shielding member 153 has been completed one turn on the outer side of the metal wire 151, and the cross-wound width Wt of the shielding member 153 may mean a width of the shielding member 153 measured in an axial direction of the submarine cable.

Specifically, as illustrated in FIG. 3, the metal shielding layer 15 of the power unit 10 of the present disclosure may be configured such that the plurality of metal wires 151 of a metal material such as copper, a copper alloy, and the like are spaced apart from each other and cross-wound in a spiral manner on the outer side of the outer semi-conductive layer 14, and the shielding member 153 provided on the outer side of the plurality of metal wires 151 is cross-wound in the same spiral direction as the cross-wound direction of the metal wires 151. That is, the cross-wound directions of the metal wire 151 and the shielding member 153 may be identically provided in the S-S direction or the Z-Z direction.

When the metal wire 151 and the shielding member 153 are cross-wound in the same direction, a restrictive force of the metal wire 151 by the shielding member 153 is less than that of the metal wire 151 when cross-wound in the opposite direction (S-Z direction or Z-S direction), which may reduce damage to the metal wire 151 and the shielding member 153 by pressure or force applied during bending or flexing of the submarine cable.

In addition, the cross-wound pitch Pt of the shielding member 153 may be provided to be smaller than the cross-wound pitch Pw of the metal wire 151. The shielding member 153 is configured to perform a role of rapidly energizing the plurality of metal wires 151 spaced apart from each other with an accident current that may flow through any one of the metal wires 151 in the event of an accident current in the submarine cable.

Since a length of contact points at which one metal wire 151 and another neighboring metal wire 151 are contacted by the shielding member 153 is longer than a length of the cross-wound pitch Pw of the metal wire 151 when the cross-wound pitch Pt of the shielding member 153 is provided to be greater than the cross-wound pitch Pw of the metal wire 151, a speed at which an accident current is energized to the plurality of metal wires is significantly slower, which may cause high heat to be generated in the metal wire 151, thereby deteriorating the durability of the submarine cable. In contrast, since the length of the contact points at which one metal wire 151 and another neighboring metal wire 151 are contacted by the shielding member 153 is shortened when the cross-wound pitch Pt of the shielding member 153 is provided to be smaller than the cross-wound pitch Pw of the metal wire 151, as in the present embodiments, the energizing speed of the accident current becomes faster, which may prevent the generation of heat at high temperatures, thereby preventing the durability of the submarine cable from being deteriorated.

Furthermore, when the cross-wound pitch Pt of the shielding member 153 is provided to be smaller than the cross-wound pitch Pw of the metal wires 151, the accident current of the disconnected metal wire 151 may be quickly energized to the other neighboring metal wires 151 even if some of the metal wires 151 are disconnected.

Meanwhile, the cross-wound pitch Pt of the shielding member 153 may be provided to be 0.8 times or less of the cross-wound pitch Pw of the metal wire 151.

When the cross-wound pitch Pt of the shielding member 153 is smaller than the cross-wound pitch Pw of the metal wires 151, but is provided to be 0.8 times or more, the arrangement of the plurality of metal wires 151 may be distorted when bending or flexing of the submarine cable occurs, resulting in a pushing phenomenon in a predetermined direction. In contrast, when the cross-wound pitch Pt of the shielding member 153 is provided to be 0.8 times or less than that of the metal wire 151, as in the present embodiment, not only may the distortion of the arrangement of the metal wires 151 be prevented in the event of bending or flexing of the submarine cable, but also the length of the contact points by the shielding member 153 between one metal wire 151 and another neighboring metal wire 151 may be further shortened, thereby further speeding up the energization of the accident current.

In addition, the cross-wound pitch Pt of the shielding member 153 may be provided to be greater than the cross-wound width Wt of the shielding member 153.

When the cross-wound pitch Pt of the shielding member 153 is provided smaller than the cross-wound width Wt of the shielding member 153, an overlapping area is created between the cross-wound shielding members 153. In this case, the shielding member 153 may strongly compress the metal wire 151 provided in a lower portion of the overlapping area of the shielding member 153 in the event of bending or flexing of the submarine cable, thereby causing a disconnection in the metal wire 151, or a break in the shielding member 153 by the metal wire 151 in the event of restoring the submarine cable from a bent state. In contrast, when the cross-wound pitch Pt of the shielding member 153 is provided to be greater than the cross-wound width Wt of the shielding member 153, as in the present embodiments, the overlapping area of the cross-wound shielding members 153 is not created, which may prevent the disconnection of the metal wire 151 in contact with the lower portion of the shielding member 153.

Meanwhile, the cross-wound pitch Pt of the shielding member 153 may be provided to be three times or more than the cross-wound width Wt of the shielding member 153.

When the cross-wound pitch Pt of the shielding member 153 is provided to be smaller than the cross-wound width Wt of the shielding member 153, but not less than three times, twisting of the metal wire 151 may occur due to compression of the shielding member 153 in the event of bending or flexing of the submarine cable, and a kink phenomenon may occur in which the twisted state of the metal wire 151 is not resolved even upon restoration of the submarine cable in the bent state. In contrast, when the cross-wound pitch Pt of the shielding member 153 is provided to be three times or more than the cross-wound width Wt of the shielding member 153, as in the present embodiments, the weight of the submarine cable may be reduced by a reduction in the amount of use of the shielding member 153, as well as the kink phenomenon of the metal wire 151 may not occur.

In addition, when the cross-wound pitch Pt of the shielding member 153 is provided to be smaller than the cross-wound width Wt of the shielding member 153, the production cost may increase due to an increase in the amount of usage of the shielding member 153, and the weight of the submarine cable including the shielding member 153 may increase. In contrast, when the cross-wound pitch Pt of the shielding member 153 is provided to be greater than the cross-wound width Wt of the shielding member 153, as in the present embodiments, the amount of usage of the shielding member may be reduced, thereby decreasing the production cost and reducing the weight of the submarine cable.

Therefore, in the submarine cable 100 according to the present disclosure, the shielding member 153 and the metal wires 151 constituting the metal shielding layer 15 of the power unit 10 are cross-wound in the same spiral direction, and the cross-wound pitch Pt of the shielding member 153 is provided to be smaller than the cross-wound pitch Pw of the metal wire 151 and greater than the cross-wound width of the shielding member 153, thereby minimizing damage to the metal wire 151 by the shielding member 153 and enabling rapid energization when an accident current occurs.

As described above, the cross-wound pitches of the metal wires and shielding member 153 constituting the metal shielding layer are configured as described above, but as described with reference to FIG. 1, it is understood that the area in which the submarine cable is laid may have a relative difference in the amount of bending and twisting. Therefore, the present disclosure may be configured such that the metal wire and the shielding member are spirally cross-wound in the same direction, but the cross-wound pitch of at least one of the metal wire 151 or the shielding member 153 within one power unit varies in consideration of the environment in which the submarine cable is laid, while being provided with the cross-wound pitch of the shielding member being smaller than the cross-wound pitch of the metal wire and greater than the cross-wound width of the shielding member.

Figure 4:
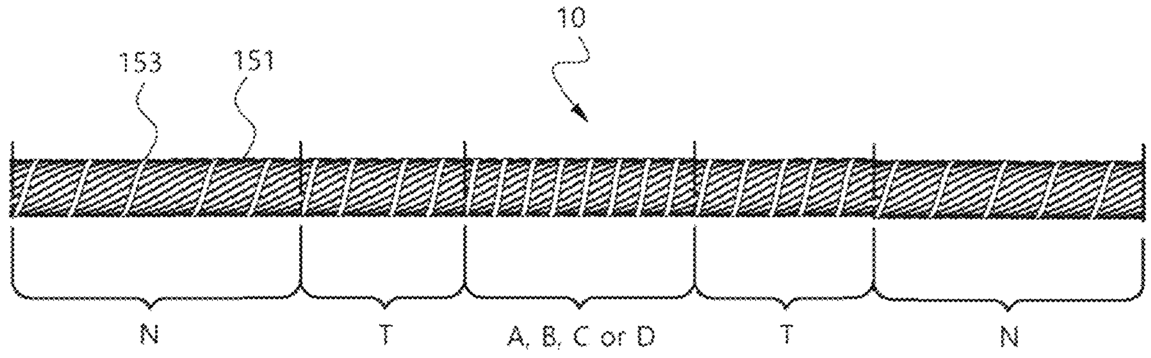
FIG. 4 illustrates variable cross-wound pitches of a metal shielding layer for a portion of the power unit illustrated in FIG. 3.

FIG. 4 illustrates variable cross-wound pitches of the metal shielding layer for a portion of the power unit illustrated in FIG. 3. The power unit illustrated in FIGS. 3 and 4 may be assumed to be a portion of the power unit constituting the dynamic submarine cable illustrated in FIG. 1, and the area labeled as A, B, C, or D in FIG. 4 may correspond to each of the different areas A, B, C, or D in FIG. 1.

In the one power unit, at least one of the metal wire 151 and the shielding member 153 may be provided with at least one bending reinforcement section A, B, C, or D cross-wound with a reinforcement cross-wound pitch reduced from a reference cross-wound pitch that is preset for each of the metal wire 151 and the shielding member 153. A section excluding the bending reinforcement section in at least one of the metal wire 151 and the shielding member 153 may be referred to as a default section N. Therefore, in the power unit of the submarine cable according to the present disclosure, the metal shielding layer may be provided including the default section for securing basic rigidity in underwater laying and the bending reinforcement section where extreme bending and twisting occurs.

Since the bending being reinforced for bending, flexing, or twisting means that flexibility increases so that a bendable bending range under an external force is large, a method of varying a deformable bending range of one power unit for each section may be configured by varying the cross-wound pitch of at least one of the metal wire 151 and the shielding member 153 constituting the metal shielding layer.

That is, in the bending reinforcement section A, B, C, or D where bending reinforcement is required, a method may be applied in which the cross-wound pitch of at least one of the metal wire 151 and the shielding member 153 constituting the metal shielding layer is configured to be shorter than the reference cross-wound pitches of the metal wire 151 and the shielding member 153 constituting the metal shielding layer in the default section N, which is the area where the submarine cable floats on the seabed, respectively. In a spiral cross-wound structure, when the cross-wound pitch is configured to be short, the deformable bending range increases, which may have the effect of increasing flexibility.

With reference to FIG. 4, the shielding member 153, which constitutes the metal shielding layer in one power unit, may be configured with at least one bending reinforcement section A, B, C, or D cross-wound with a reinforcement cross-wound pitch that is reduced from the reference cross-wound pitch that is preset for the shielding member 153 to be smaller than the cross-wound pitch of the metal wire 151. The section provided in the shielding member 153 with the reference cross-wound pitch that is preset for the shielding member 153 to be smaller than the cross-wound pitch of the metal wire 151 may be referred to as the default section N. However, the present disclosure is not limited thereto, and the bending reinforcement section A, B, C, or D may be provided in the metal wire 151 rather than the shielding member 153, or may be provided in the shielding member 153 and the metal wire 151.

When the bending reinforcement section A, B, C, or D is provided in the metal wire 151 rather than in the shielding member 153, the reference cross-wound pitch in the default section N of the metal wire 151 is provided to be greater than the reduced reinforcement cross-wound pitch in the bending reinforcement section A, B, C, or D, and the reduced reinforcement cross-wound pitch in the bending reinforcement section A, B, C, or D of the metal wire 151 is provided to be greater than the cross-wound pitches in the default section N and the bending reinforcement section A, B, C, or D of the shielding member 153.

When the bending reinforcement section A, B, C, or D is provided in the shielding member 153 and the metal wire 151, the reference cross-wound pitch in the default section N of the metal wire 151 may be provided to be greater than the reduced reinforcement cross-wound pitch in the bending reinforcement section A, B, C, or D, the reduced cross-wound pitch in the bending reinforcement section A, B, C, or D of the metal wire 151 may be provided to be greater than the reference cross-wound pitch in the default section N of the shielding member 153, and the reference cross-wound pitch in the default section N of the shielding member 153 may be provided to be greater than the reduced reinforcement cross-wound pitch in the bending reinforcement section A, B, C, or D.

Hereinafter, the bending reinforcement section A, B, C, or D is exemplarily described as being provided in the shielding member 153, but as described above, the present disclosure is not limited thereto.

In the embodiment illustrated in FIG. 4, the bending reinforcement section may be provided in at least one of a section B where a floating module b is installed, a section A where a stiffener s is installed at a site where the submarine cable and an offshore facility wb are connected, a section C where the submarine cable contacts the bottom of the seabed, or a section D where the submarine cable is connected at an intermediate point underwater, among sections where the submarine cable illustrated in FIG. 1 is disposed underwater. A section means a preset distance from an installed point, a contact point, or an intermediate connection point, which is also the same as below.

Therefore, in the section where the wind power generator wb and the submarine cable are connected in the underwater environment illustrated in FIG. 1, the stiffener s is installed, and since the movement of the submarine cable may be larger relative to the default section N in the corresponding section A, the cross-wound pitch of the shielding member 153 constituting the metal shielding layer may be configured to be shorter than the reference cross-wound pitch in the default section N of the shielding member 153.

Similarly, in the section B where the floating module b is installed, the cross-wound pitch of the shielding member 153 constituting the metal shielding layer may be configured to be shorter than the reference cross-wound pitch in the default section N of the shielding member 153 to widen the bending range for bending or twisting according to excessive movement of the submarine cable caused by the floating unit, thereby enhancing flexibility.

Likewise, in the section D where the dynamic submarine cable and the static submarine cable are connected through the intermediate junction box and the like at a fixed position in the submarine environment illustrated in FIG. 1, the flexibility may be enhanced to protect the submarine cable just as the stiffener s or floating unit b is installed.

Further, as illustrated in FIG. 1, a portion of the dynamic submarine cable provided between the wind power generators wb may be in contact with the seabed. Since the contact point is also a section of relatively large bending or twisting of the submarine cable, the bending reinforcement section may enhance the flexibility of the submarine cable even in the section C at the point where the submarine cable is in contact with the seabed to protect the submarine cable.

In order to vary the cross-wound pitch of the metal wire 151 and the shielding member 153 constituting the metal shielding layer of one power unit for each area, an analysis of the seabed environment may be performed prior to production of the power unit. The analysis of the seabed environment may mean simulating a depth of water from the seabed to the sea surface, a height of the stiffener S being installed, a point at which the floating module B is installed, a point of contact with the seabed, and the like. After analyzing the seabed environment, the bending reinforcement section that requires enhanced flexibility in the required length of the power unit may be preset.

After the bending reinforcement section is set, when the metal shielding layer of the power unit is formed, the movement speed of the power unit before the formation of the metal shielding layer is kept constant, and at least one of the cross-winding speed of the metal wire 151 and the shielding member 153 is made to vary, thereby the default section and the bending reinforcement section may be formed. However, the present disclosure is not limited thereto. For another example, after the bending reinforcement section is set, when the metal shielding layer of the power unit is formed, the cross-winding speed of at least one of the metal wire 151 and the shielding member 153 is kept constant, and the movement speed of the power unit before the formation of the metal shielding layer is made to vary, thereby the default section and the bending reinforcement section may also be formed.

In a boundary for each section of the default section and bending reinforcement section, a cross-wound pitch transition section T that reduces from the reference cross-wound pitch to the reinforcement cross-wound pitch may be provided in at least one of the metal wire 151 and the shielding member 153. However, the present disclosure is not limited thereto, when the cross-wound pitches of the metal wire 151 and the shielding member 153 are reduced from the reference cross-wound pitch to the reinforcement cross-wound pitch, the metal shielding layer may be provided with only the default section and the bending reinforcement section by applying a method of cross-winding with a reduced reinforcement cross-wound pitch after the circumference of the metal wire 151 and the shielding member 153 constituting the metal shielding layer is wound and fixed with a fixing means for the metal shielding layer, such as a separate fixing wire and the like, at the boundary for each section so that the reference cross-wound pitch is maintained until just before the metal shielding layer.

In addition, a colored tape may be provided on the outer side of the outermost layer of the submarine cable to allow the bending reinforcement section of the produced submarine cable to be identified from the outside. The bending reinforcement sections, which are preset for the total length of the submarine cable, may be specified by length even after production of the submarine cable, and the bending reinforcement sections may be identified by wrapping a colored tape on the outer side of the outermost layer of the submarine cable. In this case, the bending reinforcement sections may be positioned at points where bending or twisting frequently occurs, which requires enhanced flexibility when the submarine cable is laid underwater, thereby enabling the submarine cable to be laid easily.

While the present disclosure has been described above with reference to the exemplary embodiments, it may be understood by those skilled in the art that the present disclosure may be variously modified and changed without departing from the spirit and scope of the present disclosure disclosed in the claims. Therefore, it should be understood that any modified embodiment that essentially includes the constituent elements of the claims of the present disclosure is included in the technical scope of the present disclosure.

DESCRIPTION OF REFERENCE NUMERALS

100: Submarine cable
10: Power unit
15: Metal shielding layer
151: Metal wire
153: Shielding member
20: Optical unit
30: Shaped filler

What is claimed is:

1. A submarine cable comprising:
one or more power units,
wherein each of the one or more power units comprises:
a conductor;
an internal semi-conductive layer surrounding the conductor;
an insulating layer surrounding the internal semi-conductive layer;
an outer semi-conductive layer surrounding an outer side of the insulating layer; and
a metal shielding layer provided on an outer side of the outer semi-conductive layer,
wherein the metal shielding layer includes a plurality of metal wires spaced apart from and spirally cross-wound on the outer side of the outer semi-conductive layer, and a shielding member cross-wound on an outer side of the plurality of metal wires, and
wherein the plurality of metal wires and the shielding member are cross-wound in the same spiral direction, and a cross-wound pitch of the shielding member is smaller than a cross-wound pitch of the plurality of metal wires and greater than a cross-wound width of the shielding member.

2. The submarine cable of claim 1, wherein the cross-wound pitch of the shielding member is provided to be 0.8 times or less than the cross-wound pitch of each of the plurality of metal wires and three times or more than the cross-wound width of the shielding member.

3. The submarine cable of claim 1, wherein, in one power unit, at least one of the plurality of metal wires and the shielding member is provided with at least one bending reinforcement section cross-wound with a reinforcement cross-wound pitch reduced from a reference cross-wound pitch that is preset for each of the plurality of metal wires and the shielding member.

4. The submarine cable of claim 3, wherein the at least one bending reinforcement section is a section in which a floating module is installed among sections in which the submarine cable is disposed underwater.

5. The submarine cable of claim 3, wherein the at least one bending reinforcement section is a section in which a stiffener is installed at a site where the submarine cable and an offshore facility are connected.

6. The submarine cable of claim 3, wherein the at least one bending reinforcement section is a section at a point where the submarine cable is in contact with a seabed.

7. The submarine cable of claim 3, wherein the at least one bending reinforcement section is a section at a point where the submarine cable is connected at an intermediate point underwater.

8. The submarine cable of claim 1, wherein the shielding member is provided as a tape made of a metal material.

9. The submarine cable of claim 1, wherein the shielding member is a braided strap in which a plurality of metal wire rods are braided such that a cross sectional width is greater than a cross sectional thickness.

10. The submarine cable of claim 1, wherein the submarine cable further comprises:
a plurality of power units;
a plurality of shaped fillers disposed between the plurality of power units to receive the plurality of power units in a state in which the plurality of power units are spaced apart from each other, and constituting a cross-sectional shape of the submarine cable as a circular shape;
at least one optical unit received in at least one of the plurality of shaped fillers, and provided with an optical fiber;
a bedding layer provided on an outer side of the plurality of power units and the plurality of shaped fillers;
at least one armor layer provided with a plurality of armor wires disposed on an outer side of the bedding layer being cross-wound; and
an outermost layer provided on an outer side of the at least one armor layer.

* * * * *